UNITED STATES PATENT OFFICE.

WILLIAM A. LAWRENCE, OF NEW YORK, N. Y.

IMPROVEMENT IN COMPOSITIONS OF HOP-EXTRACT FOR FLAVORING.

Specification forming part of Letters Patent No. 156,802, dated November 10, 1874; application filed August 26, 1874.

*To all whom it may concern:*

Be it known that I, WILLIAM A. LAWRENCE, of the city, county, and State of New York, have invented a certain Compound Hop-Extract Flavoring, to be used in imparting the aroma and flavor of the hop to various articles, and especially to fermented beer, of which the following is a specification:

This invention consists in a composition formed by uniting the essential oil and bitter principle of hops with glycerine, grape-sugar, cane-sugar, and other substances, in such proper proportions as to cause the specific gravity of the compound to be greater than that of beer, and in melting and otherwise uniting the component parts, in such a manner that the compound, when introduced into the beer, will sink and freely dissolve, leaving the aroma and flavor of the hop in the beer.

The value and usefulness of this invention are shown as follows: The flavor and aroma of the hop, which are essential in the manufacture of beer, and for which no substitute can be obtained, are imparted, in the first instance, to the beer by boiling hops in the beer-wort.

The aromatic oil of hops is very volatile, and, in the process of boiling, a very large proportion of it is lost. In order to make up this loss, and give to the beer the desired amount of hop-flavor, the brewer is obliged to use a larger quantity of hops than would otherwise be sufficient, and, even in addition to this extra quantity of hops used, he has heretofore been obliged to remedy a deficiency of hop-flavor by introducing hops into the beer after it has been fermented and barreled. This process is attended with great trouble and damage, arising from the presence of a mass of hops in the barrels or kegs.

If the highly-concentrated aromatic oil of hops was practicably soluble in cold beer, the before-described extract would be free from objection; but, as its specific gravity is less than that of beer, it remains upon the surface of the latter and forms a mass that is not readily and practically soluble; and, as the beer is drawn off or agitated, it is liable to be left on the inside surface of the barrel, and remain altogether useless.

Now, to make the extract readily soluble, and to diffuse the hop-flavor throughout the beer when cold, I take, for example, one ounce of the hop-extract, one-half ounce of pure glycerine, four ounces of grape-sugar, and three ounces of dry cane-sugar, and subject these materials to such an amount of heat and agitation as shall form them into a uniform mass. These proportions may be varied to suit the various kinds and "degrees" of beer, care being taken to keep the specific gravity greater than that of beer, and to preserve the solubility of the compound.

When introduced into the beer this flavoring is found to sink at once, dissolve freely, diffuse the desired hop-flavor throughout the beer, and also to resist any tendency in the beer toward damage by "souring," or acetic fermentation.

What I claim as my invention is—

The hereinbefore-described compound, consisting of glycerine, grape-sugar, and cane-sugar, combined with the essential oil and bitter principle of hops, substantially as specified.

W. A. LAWRENCE.

Witnesses:
 ELLIOT SANDFORD,
 NATHANIEL ELLIS.